(12) United States Patent
West (10) Patent No.: US 9,179,306 B2
(45) Date of Patent: Nov. 3, 2015

(54) TECHNIQUES FOR THIRD-PARTY CONTENT DELIVERY VIA A UNIQUE MOBILE APPLICATION ADDRESS

(75) Inventor: Graham West, Edinburgh (GB)

(73) Assignee: NCR Corporation, Duluth, GA (US)

( * ) Notice: Subject to any disclaimer, the term of this patent is extended or adjusted under 35 U.S.C. 154(b) by 77 days.

(21) Appl. No.: 13/222,139

(22) Filed: Aug. 31, 2011

(65) Prior Publication Data

US 2013/0055406 A1 Feb. 28, 2013

(51) Int. Cl.
*G06F 21/10* (2013.01)
*H04N 21/4405* (2011.01)
*H04W 12/08* (2009.01)
*H04L 29/08* (2006.01)
*G06Q 30/06* (2012.01)
*H04L 29/12* (2006.01)
*H04W 4/00* (2009.01)

(52) U.S. Cl.
CPC .............. *H04W 12/08* (2013.01); *G06F 21/10* (2013.01); *G06Q 30/0601* (2013.01); *H04L 61/106* (2013.01); *H04L 67/20* (2013.01); *H04L 67/28* (2013.01); *H04W 4/00* (2013.01)

(58) Field of Classification Search
CPC .............. G06Q 10/02; G06Q 30/0238; G06Q 30/0613; G06Q 50/30; G06Q 50/14
USPC ............... 370/328; 705/50, 51; 709/203, 213, 709/217, 246; 726/26
See application file for complete search history.

(56) References Cited

U.S. PATENT DOCUMENTS

| | | | | |
|---|---|---|---|---|
| 2002/0169892 | A1* | 11/2002 | Miyaoku et al. | 709/246 |
| 2004/0030658 | A1* | 2/2004 | Cruz | 705/65 |
| 2005/0070257 | A1* | 3/2005 | Saarinen et al. | 455/414.1 |
| 2006/0081704 | A1* | 4/2006 | Boyd | 235/382 |
| 2006/0165060 | A1* | 7/2006 | Dua | 370/352 |
| 2007/0162390 | A1* | 7/2007 | Pancholy et al. | 705/50 |
| 2007/0168288 | A1* | 7/2007 | Bozeman | 705/51 |
| 2008/0300926 | A1* | 12/2008 | Di Costanzo et al. | 705/5 |
| 2009/0265552 | A1* | 10/2009 | Moshir et al. | 713/168 |
| 2010/0211651 | A1* | 8/2010 | Guedalia et al. | 709/217 |
| 2010/0279665 | A1* | 11/2010 | Hardin et al. | 455/414.1 |
| 2011/0258110 | A1* | 10/2011 | Antoci | 705/39 |
| 2012/0173654 | A1* | 7/2012 | Tsao et al. | 709/213 |

FOREIGN PATENT DOCUMENTS

| | | |
|---|---|---|
| GB | 2 361 570 | 11/2009 |
| GB | 2 459 686 | 11/2009 |
| GB | 2 460 240 | 11/2009 |
| WO | 2006029639 | 3/2006 |

* cited by examiner

Primary Examiner — Peter Poltorak
Assistant Examiner — Huan V Doan
(74) *Attorney, Agent, or Firm* — Joseph P. Mehrle (57) ABSTRACT

Techniques for third-party content delivery via a unique mobile application address are presented. A mobile application on a mobile device of a consumer generates or is assigned a unique address. The consumer uses the mobile application to communicate with an enterprise over a network. The enterprise delegates delivery of content to the mobile application to a third-party service and provides the unique address. The third-party service directly sends the content over the network to the mobile application of the mobile device on behalf of the enterprise.

18 Claims, 5 Drawing Sheets

TECHNIQUES FOR THIRD-PARTY CONTENT DELIVERY VIA A UNIQUE MOBILE APPLICATION ADDRESS

BACKGROUND

Consumers are increasingly using automated mechanisms to perform every day transactions. Kiosks exist to avoid enterprise personnel and lines. These automated kiosks allow consumers to perform transactions with an enterprise or agency with little to no human intervention. Individuals also perform transactions online and are capable of using their smart phones to check out of stores.

Some transactions, via mobile phones or other portable devices, also require security with delivery of secure content from an enterprise to a customer. For example, automated processing of boarding passes from airlines requires direct delivery of the boarding pass from the airlines to the phone, laptop, or tablet of a customer.

Consequently, many enterprises that require secure delivery of content have by and large retained legacy processing associated with delivery of such content to the customers. This is done for security reasons and because altering existing legacy processing to accommodate outsourcing of content delivery to a third-party is believed to be too difficult or too costly for the enterprises to accomplish.

Still another reason for not migrating to third-party outsourcing of content delivery is the perception that such outsourcing would entail manual actions by the customer and changes to the customer's existing applications and devices, which the customers may or may not embrace. For these reasons and others, most enterprises continue to deliver their secure content directly to their customers' portable devices even though most of these enterprises are not skilled in such technology and it is not their primary focus and area of expertise. That is, nearly every enterprise believes that to compete they have to offer what everyone else is offering the customer and these days this includes automated transactional processing and content delivery to mobile devices. Any changes to this legacy model for an enterprise must be seamless to the customers and require little to no changes by the customer in order to ensure acceptance of such changes by the customers.

SUMMARY

In various embodiments, techniques for third-party content delivery via a unique mobile application address are presented. According to an embodiment, a method for third-party content delivery is discussed.

Specifically, a unique address is obtained for a mobile application that is processing on a first device of a user also a request is received from a content service to deliver customized secure content to the user on the first device. Next, the customized secure content is acquired for the user based on the unique address and the request. Finally, the customized secure content is delivered to the mobile application using the unique address.

DETAILED DESCRIPTION

Figure 1:
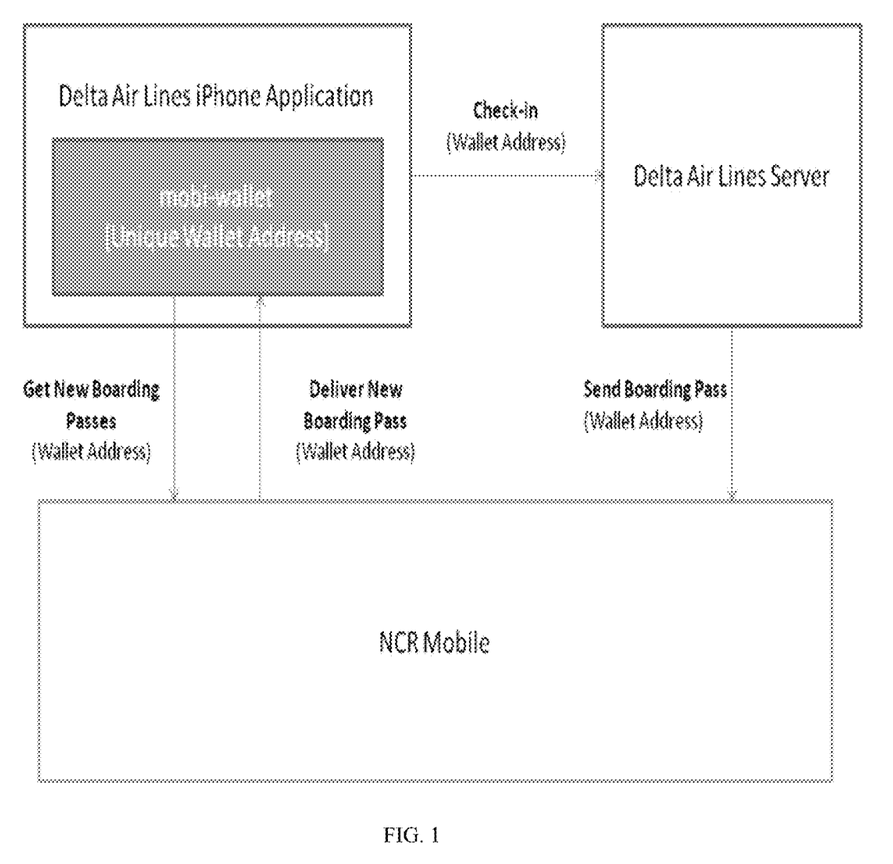
FIG. 1 is a diagram of an example architecture for third-party delivery of a boarding pass, according to an example embodiment.

FIG. 1 is a diagram of an example architecture for third-party delivery of a boarding pass, according to an example embodiment. The components of the architecture are implemented as instructions programmed and residing on a non-transitory computer-readable (processor-readable) storage medium and executed by one or more processors. The processors are specifically configured and programmed to process the components. Moreover, the components operate over a network. The network is wireless or a combination of wired and wireless. In an embodiment, the network is the Internet, a cellular network, a Wi-Fi network, a satellite network, or the network is a combination or all of these networks.

The components of the architecture and the architecture itself are presented for purposes of illustration only. Moreover, the components are discussed within the context of a specific operating scenario that utilizes NCR®'s Mobi-app™ in connection with Delta®'s web services. It is noted that this specific situation is presented for illustrating the operation of some techniques presented herein and below and the invention is not intended to be specifically limited to this sample scenario.

In the example scenario presented, a mobile application is provided (NCR®'s Mobi-app™) that creates a unique address for itself. This is typically done the first time that an application is executed after being downloaded. This persists for the lifetime of the mobile application on that Smartphone. It is noted that a laptop, tablet, and other devices can be used as well and the techniques are not specific to mobile phones although the techniques are particularly useful as mobile phone services.

This unique address is then passed to the airline's Web site (Delta®) during the check-in process. Once the airline has checked the customer onto the flight, the airline's Web site passes the unique address of the customer's mobile application to the NCR® server that creates and delivers barcode boarding passes.

The NCR® server communicates with the mobile application (the mobile application is pre-coded with the Web services address of the NCR® server). The mobile application periodically communicates with the NCR® Web server to check for any updates, such as a new boarding pass being available.

The NCR® server uses the unique address passed to it by the airline's Web site to associate the barcode boarding pass request from the airline with the mobile application communicating with the NCR® server.

The NCR® server then delivers the boarding pass barcode directly to the mobile application. The mobile application stores the boarding pass barcode and can display it in response to a customer request.

Again, it is noted that usage of NCR® products and Delta® produces is presented for an example illustration and the embodiments of the invention are not to be so limited to this specific scenario and/or suite of products.

Figure 2:
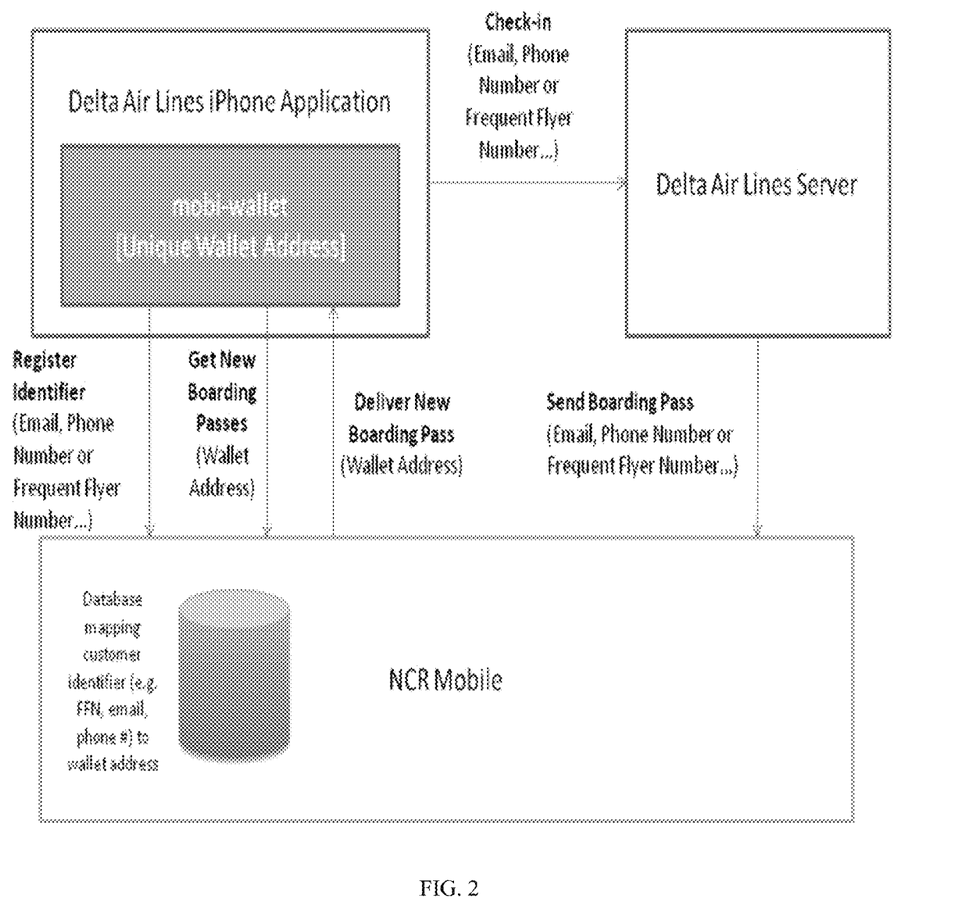
FIG. 2 is a diagram of another architecture for third-party delivery of a boarding pass, according to an example embodiment.

FIG. 2 is a diagram of another architecture for third-party delivery of a boarding pass, according to an example embodiment. The components of the architecture are implemented as instructions programmed and residing on a non-transitory computer-readable (processor-readable) storage medium and executed by one or more processors. The processors are specifically configured and programmed to process the components. Moreover, the components operate over a network. The network is wireless or a combination of wired and wireless. In an embodiment, the network is the Internet, a Bluetooth network, a cellular network, a Wi-Fi network, a satellite network, other types of networks, or the network is a combination or all of these networks.

Again, the components of the FIG. 2 architecture are presented within a specific example scenario utilizing NCR®'s Mobi-app™ and Delta® web site processing. The invention is not so limited to this specific operating scenario and is presented for purpose of illustrating a specific outsourcing situation for barcode processing of boarding passes.

As an extension of the processing of the FIG. 1, there is an additional registration step where the passenger's Smartphone registers traveler information with the NCR® server during one of the communication sessions between the mobile application and the NCR® server.

This traveler information may include a frequent flyer number (FFN), an email address, a mobile phone number, and/or the like. If the airline currently uses some of this information to deliver content (e.g. the email address) then the NCR® server receives that information from the airline. The NCR® server can then associate that registered information with the unique address for that Smartphone mobile application, and can then send the information to the unique address in the same way as described above.

The techniques herein discussed above and below enable airlines (or other travel or secure content providers) to outsource delivery of content to mobile devices via a third party without the customer (passenger having the mobile device) having to enter any data or make any selections.

The techniques herein discussed above and below also enable offline storage and access to boarding passes or other secure content.

Figure 3:
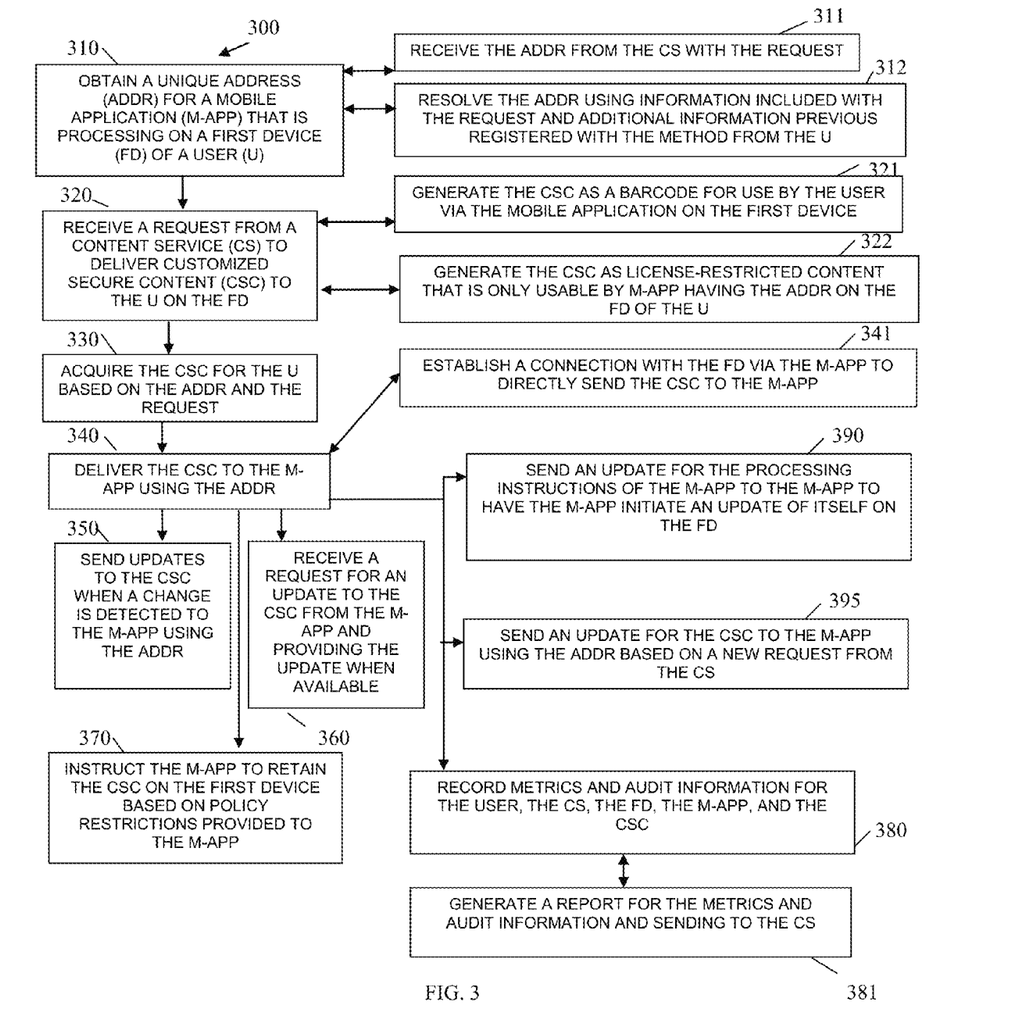
FIG. 3 is a diagram of a method for third-party content delivery, according to an example embodiment.
Figure 4:
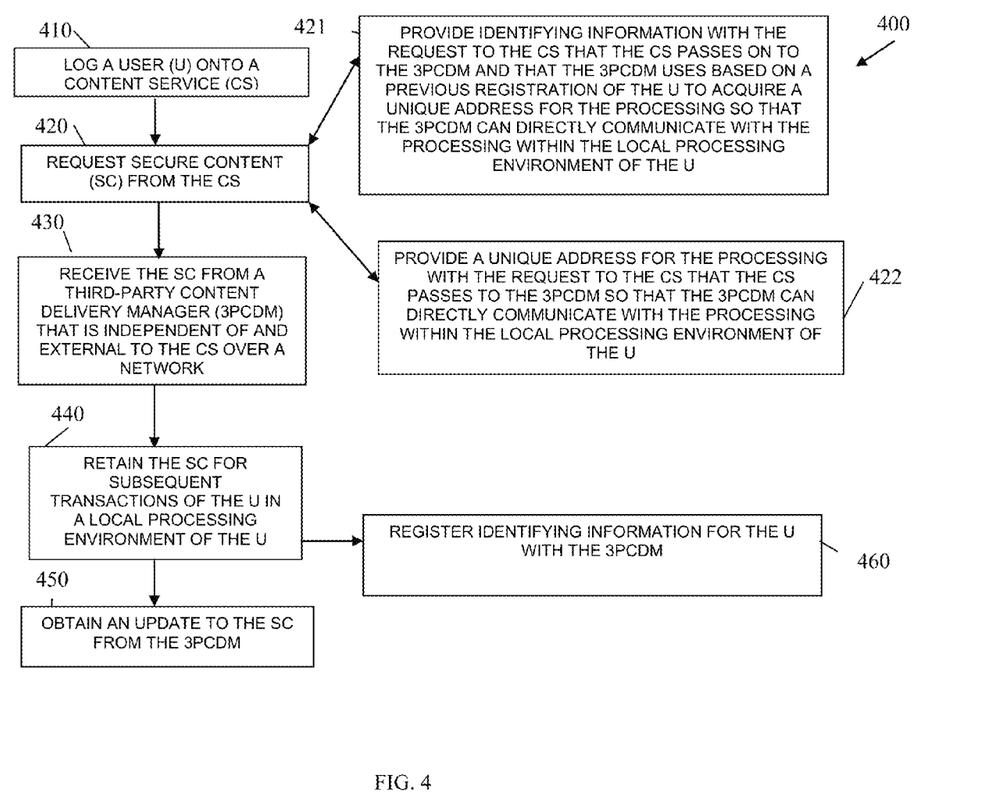
FIG. 4 is a diagram of another method for third-party content delivery, according to an example embodiment.
Figure 5:
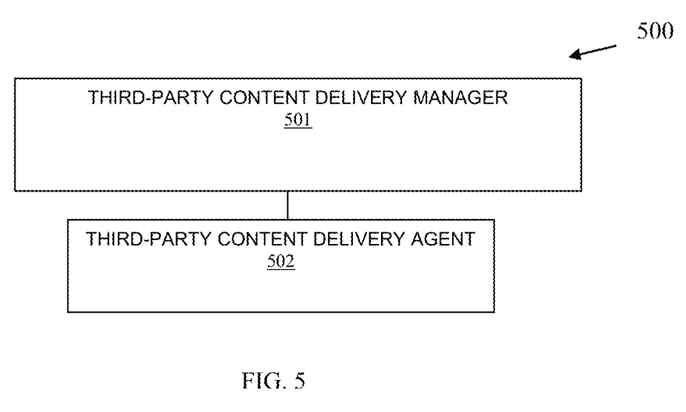
FIG. 5 is a diagram of a third-party content delivery system, according to an example embodiment.

FIGS. 3-5 are now presented in a more generic sense to describe how secure content delivery is outsourced to a third-party by utilizing a unique mobile application address.

FIG. 3 is a diagram of a method 300 for third-party content delivery, according to an example embodiment. The method 300 (hereinafter "third-party content delivery manager") is implemented as instructions and programmed within a non-transitory computer-readable (processor-readable) storage medium that executes on one or more processors of a server (such as cloud processing environment), the processors of the server are specifically configured to execute the third-party content delivery manager. The third-party content delivery manager is operational over a network; the network is wireless or a combination of wired and wireless. In an embodiment, the network is the Internet, a Wi-Fi network, a cellular network, a Bluetooth network, a satellite network, other types of networks, or the network is a combination or all of these networks.

The processing of the third-party content delivery manager is presented from the perspective of the third-party content delivery system. That is, a content authorizing enterprise is a trusted and secure relationship with the third-party content delivery manager and permits the third-party content delivery manager to securely deliver content on behalf of the content authorizing enterprise to customers of the content authorizing enterprise.

At 310, the third-party content delivery manager obtains a unique address for a mobile application that is processing on a first device of a user. In an embodiment, the first device is a mobile phone. In other cases, the mobile device is a laptop, a tablet, and the like. The mobile application initially downloaded and installed on the first device by the user from either a content service (discussed below at 320) or from the third-party content delivery manager. That is, the mobile application can be a modified version of a legacy application of a content service or the mobile application is distributed by a third-party that is independent of the content service via the third-party content delivery manager.

According to an embodiment, at 311, the third-party content delivery manager receives the unique address for the mobile application from the content service with the request. That is, as depicted in the sample scenario of the FIG. 1, the content service (Delta® in the sample situation of the FIG. 1), sends the request to the third-party content delivery manager along with a unique address for the mobile application. In some cases, the mobile application is configured to provide the unique address to the content service or the content service can assign a unique address based on the request.

In another embodiment, at 312, the third-party content delivery manager resolves the unique address for the mobile application using information included with the request and additional information previously registered with the processing of the third-party content delivery manager from the user. This scenario was presented above with the sample discussion of the FIG. 2. For example, a frequent flyer number may have been previously registered with the third-party content delivery manager and the content service sends the request, which includes the frequent flyer number. When the user initially registers, the third-party content delivery manager maps the frequent flyer number to the unique address of the mobile application so when the request is made with the frequent flyer number the third-party content delivery manager can acquire the mapping to obtain the unique address of the mobile application.

At 320, the third-party content delivery manager receives a request from a content service to deliver customized secure content to the user on the first device. The customized secure content can be directed to a variety of types of content.

For example, at 321, the third-party content delivery manager generates the customized secure content as a barcode for use by the user via the mobile application on the first device. This scenario was presented above with reference to the FIGS. 1 and 2.

In another case, at 322, the third-party content delivery manager generates the customized secure content as license-restricted content that is only usable by the mobile application that has the unique address on the first device of the user. For example, suppose a license-restricted video is being delivered to the first device. The secure content may include license restrictions that the mobile application enforces on the first device with respect to usage of the video. Other situations can exists as well with license-restricted content.

At 330, the third-party content delivery manager acquires the customized secure content for the user based on the unique address and the request. That is, the request identifies how the third-party content delivery manager is to generate the customized secure content or where the third-party content delivery manager is to acquire the customized secure content.

At 340, the third-party content delivery manager dynamically and directly delivers the customized secure content to the mobile application using the unique address. This occurs over a network, such as Internet, Wi-Fi, cellular, satellite, or combinations of these.

According to an embodiment, at 341, the third-party content delivery manager establishes a connection with the first device via the mobile application to directly send the customized secure content to the mobile application. In other words, the mobile application includes communication authentication logic in this embodiment to permit a connection of the third-party content delivery manager.

In another situation, at 350, the third-party content delivery manager sends updates to the customized secure content when a change is detected to the mobile application using the unique address. In other words, the customized secure content is changed and the update reflecting the change is dynamically noticed by the third-party content delivery manager and dynamically pushed to the mobile application.

In another case, at 360, the third-party content delivery manager receives a request for an update to the customized secure content from the mobile application and in response, the third-party content delivery manager provides the update to the customized secure content when it is available. This is a dynamic pull situation initiated by the mobile application based on configured parameters in the mobile application or based on directions of the user interacting with the mobile application on the first device.

In an embodiment, at 370, the third-party content delivery manager instructs the mobile application to retain the customized secure content on the first device based on policy restrictions provided to the mobile application. In other words, a specific length of time or a specific detected event can trigger the mobile application to remove the customized secure content from the first device. The specific length of time or the specific detected event defined via the policy. The policy provided to the mobile application via the third-party content delivery manager or preconfigured with the mobile application when the mobile application is initiated on the first device.

In still another case, at 380, the third-party content delivery manager records metrics and audit information for the user, the content service, the first device, the mobile application, and the customized secure content. The metrics and audit information can also be defined based on policy evaluation and in some cases the mobile application is preconfigured to supply some of the information.

Continuing with the embodiment of 380 and at 381, the third-party content delivery manager generates a report for the metrics and audit information and then sends the report to the content service. The report can be generated based on policy evaluation in an automated manner or the report can be requested via an instruction received from another service or an administrator.

In yet another scenario, at 390, the third-party content delivery manager sends an update for the processing instructions of the mobile application to the mobile application to have the mobile application initiate an update of itself on the first device. This is a scenario where the third-party distributes the mobile application and the mobile application is configured to recognize an update instruction and execute an update package that shuts down a running instance of itself on the first device and causes an update to the mobile application on the first device.

According to an embodiment, at 395, the third-party content delivery manager sends an update for the customized secure content to the mobile application based on a new request received from the content service. Here, the content service initiates an update to the customized secure content by contacting the third-party content delivery manager.

FIG. 4 is a diagram of another method 400 for third-party content delivery, according to an example embodiment. The method 400 (hereinafter "third-party content delivery agent") is implemented as instructions and programmed within a non-transitory computer-readable (processor-readable) storage medium that executes on one or more processors of a mobile device, the processors of the mobile device are specifically configured to execute the shopping collaboration agent. The third-party content delivery agent is operational over a network; the network is wireless or a combination of wired and wireless. In an embodiment, the network is the Internet, a Wi-Fi network, a cellular network, a satellite network, a Bluetooth network, other types of networks, or the network is a combination or all of these networks.

In an embodiment, the third-party content delivery agent describes processing actions from the perspective of a specific customer that is interacting with shopping collaboration manager described above with reference to the FIG. 1, via a mobile device (e.g., phone, laptop, tablet, and the like). In an embodiment, the third-party content delivery agent interacts with the third-party content delivery manager represented by the method 300 of the FIG. 3 and discussed in detail above.

At 410, the third-party content delivery agent logs a user onto a content service. This can be achieved based on actions of the user that interacts with the content service for purposes of acquiring secure content of some type, such as a boarding pass having a barcode and others.

At 420, the third-party content delivery agent requests secure content from the content service. So, after successful log in and authentication of the user to the content service and based on actions of the user, secure content is requested from the content service.

According to an embodiment, at 421, the third-party content delivery agent provides identifying information with the request to the content service that the content service then passes on to a third-party content delivery manager (such as the third-party content delivery manager of the FIG. 4 discussed above). The third-party content delivery manager uses the identifying information to compare against previous registration information of the user to acquire a unique address for the processing of the third-party content delivery agent so that the third-party content delivery manager can directly communicate with the processing of the third-party content delivery agent within a local processing environment of the user (a device having and processing the third-party content delivery agent and controlled by the user).

In another case, at 422, the third-party content delivery agent provides a unique address for the processing with the request to the content service. The content service then passes the unique address on to a third-party content delivery manager so that the third-party content delivery manager can directly communicate with the processing of the third-party content delivery agent within the local processing environment of the user (a device having and processing the third-party content delivery agent and controlled by the user).

At 430, the third-party content delivery agent receives the secure content from a third-party content delivery manager, which is independent of and external to the content service over a network.

At 440, the third-party content delivery agent retains the secure content for subsequent transactions of the user in a local processing environment of the user (a device having and processing the third-party content delivery agent and controlled by the user).

According to an embodiment, at 450, the third-party content delivery agent obtains an update to the secure content from the third-party content delivery manager. This may be solicited (pulled) by the third-party content delivery agent or it may be unsolicited (pushed) by the third-party content delivery manager.

In an embodiment, at 460, the third-party content delivery agent registers identifying information for the user with the third-party content delivery manager.

FIG. 5 is a diagram of a third-party content delivery system 500, according to an example embodiment. The third-party content delivery system 500 includes one or more processors that are specifically configured to perform, inter alia, the processing associated with the methods 300 and 400 of the FIGS. 3 and 4, respectively. Furthermore, the third-party content delivery system 500 is operational over a network and the network can be wireless or a combination of wired and wireless. In an embodiment, the network is the Internet. In another case, the network is a cellular network. It yet another situation, the network is a satellite network. In still another case, the network is a Wi-Fi network. It may also be that the network uses all or a combination of: the Internet, cellular network, Wi-Fi network, and/or satellite network.

The third-party content delivery system 500 includes a third-party content delivery manager 501 and a third-party content delivery agent 502. Each of these and their interactions with one another will now be discussed in turn.

The third-party content delivery manager 501 processes on a physical machine or a Virtual Machine (VM) (first machine) and is operational over a network. That is, the third-party content delivery manager 501 is implemented, resides, and programmed within a non-transitory processor-readable medium as executable instructions that a processor-enabled device executes. In some cases, the third-party content delivery manager 501 is accessible via one or more cloud processing environments. Example processing associated with the third-party content delivery manager 501 was presented above with reference to the FIGS. 1-3.

The third-party content delivery manager 501 is configured to interact with a content service that the third-party content delivery agent 502 communicates with to acquire secure content for a user of the second machine (machine of the third-party content delivery agent 502).

The third-party content delivery manager 501 also configured to identify a unique address for the third-party content delivery agent 502 and directly and dynamically deliver the secure content on behalf of the content service to the third-party content delivery agent 502.

The third-party content delivery agent 502 is implemented, programmed, and resides within a non-transitory processor-readable storage medium and executes on a mobile device (second machine) of a consumer. Example processing associated with the third-party content delivery agent 502 was presented above in detail with respect to the FIGS. 1-2 and 4.

The third-party content delivery agent 502 is configured to manage the secure content on the second machine and interact with the content service and the third-party content delivery manager 501.

According to an embodiment, the first machine of the third-party content delivery manager 501 is located in a cloud processing environment and the second machine of the third-party content delivery agent 502 is a mobile phone of the user.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A processor-implemented method programmed in a non-transitory processor-readable medium and to execute on one or more processors configured to execute the method, comprising:

obtaining a unique address for a mobile application that is processing on a first device of a user, wherein obtaining further includes creating, by the mobile application, the unique address when the mobile application executes a first time on the first device and persisting, by the mobile application, the unique address on the first device for a lifetime of the mobile application on the first device;

receiving a request from a content service to deliver customized secure content to the user on the first device, the request defining where the customized secure content is to be acquired;

acquiring the customized secure content for the user based on the unique address and the request; and delivering the customized secure content to the mobile application using the unique address, wherein obtaining further includes resolving the unique address using information included with the request and additional information previous registered with the method from the user.

2. The method of claim 1, wherein obtaining further includes receiving the unique address from the content service with the request.

3. The method of claim 1, wherein acquiring further includes generating the customized secure content as a barcode for use by the user via the mobile application on the first device.

4. The method of claim 1, wherein acquiring further includes generating the customized secure content as license-restricted content that is only usable by the mobile application having the unique address on the first device of the user.

5. The method of claim 1, wherein delivering further includes establishing a connection with the first device via the mobile application to directly send the customized secure content to the mobile application.

6. The method of claim 1 further comprising, sending updates to the customized secure content, when a change to the customized secure content is detected, to the mobile application using the unique address.

7. The method of claim 1 further comprising, receiving a request for an update to the customized secure content from the mobile application and providing the update when available.

8. The method of claim 1 further comprising, instructing the mobile application to retain the customized secure content on the first device based on policy restrictions provided to the mobile application.

9. The method of claim 1 further comprising, recording metrics and audit information for the user, the content service, the first device, the mobile application, and the customized secure content.

10. The method of claim 9 further comprising, generating a report for the metrics and audit information and sending to the content service.

11. The method of claim 1 further comprising, sending an update for the processing instructions of the mobile application to the mobile application to have the mobile application initiate an update of itself on the first device.

12. The method of claim 1 further comprising, sending an update for the customized secure content to the mobile application using the unique address based on a new request from the content service.

13. A processor-implemented method programmed in a non-transitory processor-readable medium and to execute on one or more processors configured to execute the method, comprising:

logging a user onto a content service based at least in part on a unique address for a mobile application processing the method and executing on the one or more processors, and wherein processing further includes creating, by the mobile application, the unique address when the mobile application executes a first time on the one or more processors and persisting, by the mobile application, the unique address for a lifetime of the mobile application;

requesting secure content from the content service;

receiving the secure content from a third-party content delivery manager that is independent of and external to the content service over a network the third-party content delivery manager directly communicates with a local processing environment of the user, wherein the third-party content delivery manager resolves the unique address using information included with the request and additional information previous registered with the method from the user; and retaining the secure content for subsequent transactions of the user in the local processing environment of the user, the secure content retained in the local processing environment until a specific event triggers the local processing environment to remove the secure content, the event configured within the local processing environment on initiation of the local processing environment.

14. The method of claim 13 further comprising, obtaining an update to the secure content from the third-party content delivery manager.

15. The method of claim 13 further comprising, registering identifying information for the user with the third-party content delivery manager.

16. The method of claim 13, wherein requesting further includes providing identifying information with the request to the content service that the content service passes on to the third-party content delivery manager and that the third-party content delivery manager uses based on a previous registration of the user to acquire the unique address for the mobile application representing the processing of the method so that the third-party content delivery manager can directly communicate with the mobile application within the local processing environment of the user.

17. A system, comprising:

a first machine having a third-party content delivery manager implemented in a non-transitory computer-readable storage medium and which processes on the first machine; and a second machine having a third-party content delivery agent implemented in a non-transitory computer-readable storage medium and which processes on the second machine;

the third-party content delivery manager configured to interact with a content service that the third-party content delivery agent communicates with to acquire secure content for a user of the second machine, the third-party content delivery manager also configured to identify a unique address for the third-party content delivery agent based on a prior registration of the second machine, wherein the unique address is created by the third-party content delivery agent when the mobile application executes a first time on the second machine and the unique address is persisted, by the third-party content delivery agent, on the second machine for a lifetime of the third-party content delivery agent on the second machine, and the third-party content delivery manager configured to directly deliver the secure content on behalf of the content service to the third-party content delivery agent based on a request from the third-party content delivery agent, the request defines where the third-party content delivery manager is to acquire the secure content, wherein the third-party content delivery manager resolves the unique address using information included with the request and additional information previous registered with the processing of the third-party content delivery manager from the user, the third-party content delivery agent configured to manage the secure content on the second machine and interact with the content service and the third-party content delivery manager.

18. The system of claim 17, wherein the first machine is located in a cloud processing environment and the second machine is a mobile phone of the user.

* * * * *